United States Patent
Schuff et al.

[15] 3,696,987
[45] Oct. 10, 1972

[54] COATED CUP AND METHOD OF MANUFACTURE

[72] Inventors: Richard William Schuff, Phoenix; Edson Sheppard Harris, Jr., Scottsdale, both of Ariz.

[73] Assignee: Dart Industries Inc., Los Angeles, Calif.

[22] Filed: Feb. 26, 1971

[21] Appl. No.: 119,162

[52] U.S. Cl..............229/1.5 B, 99/171 T, 99/171 C, 99/171 LP, 99/178, 117/95, 117/101, 117/105.3, 117/138.8 UA, 117/161 A, 117/119.6, 229/3.1
[51] Int. Cl..............................B65d 3/06, B44d 1/08
[58] Field of Search .......229/1.5 B, 3.5 R, 3.1; 215/1; 117/95, 106, 105.3, 138.8 UA, 161 A, 119.6; 99/171 T, 171 C, 171 LP, 178

[56] References Cited

UNITED STATES PATENTS

| | | |
|---|---|---|
| 3,049,277 | 8/1962 | Shappell..................229/1.5 B |
| 3,328,196 | 6/1967 | Sincock................229/3.5 R X |

*Primary Examiner*—Edward G. Whitby
*Attorney*—Paul R. Wylie, Harold R. Beck and Leigh B. Taylor

[57] ABSTRACT

An improved package comprising an expanded plastic bead container preferably of styrene and a coating on the container comprising a saran latex material set in direct contact with the expanded plastic bead container. The improved package of the invention provides a vapor and liquid barrier and restricts the entrance of oxygen and other gases to the package as well as providing greater insulation capacity.

12 Claims, 4 Drawing Figures

PATENTED OCT 10 1972
3,696,987
SHEET 1 OF 2
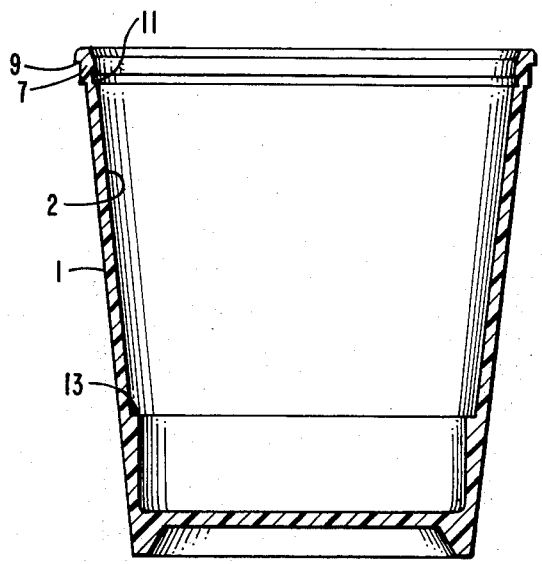
FIG.—1
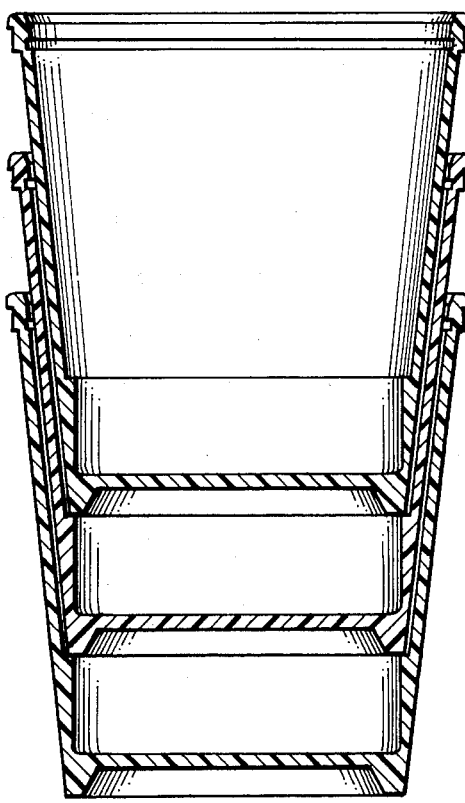
FIG.—3
INVENTORS
RICHARD WILLIAM SCHUFF
EDSON SHEPPARD HARRIS, JR.
BY
Paul R. Wylie
ATTORNEY PATENTED OCT 10 1972 3,696,987
SHEET 2 OF 2
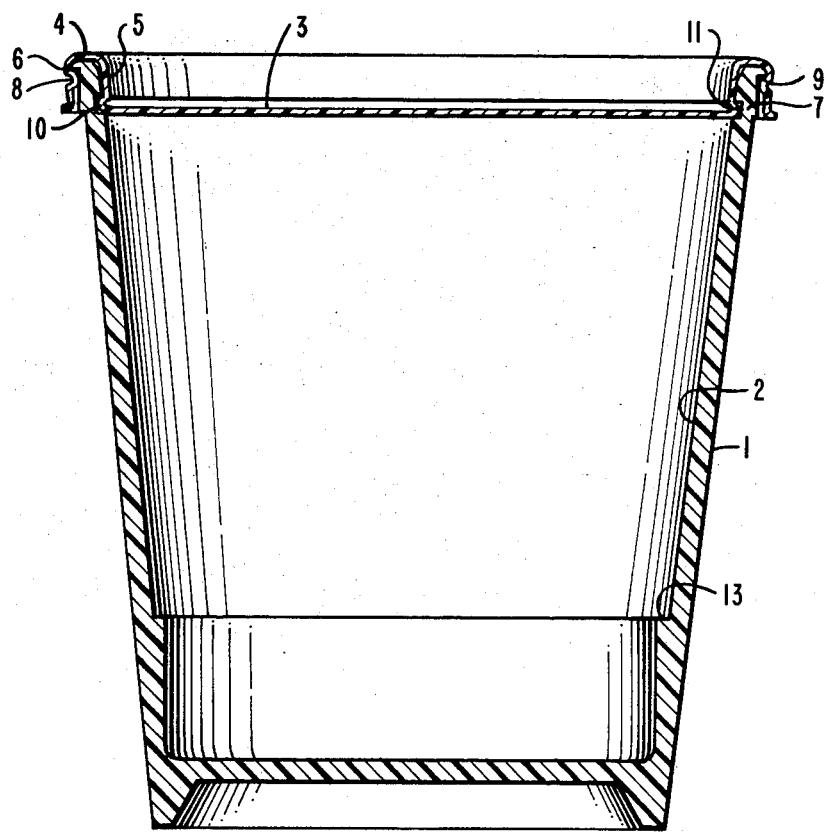
FIG.—2
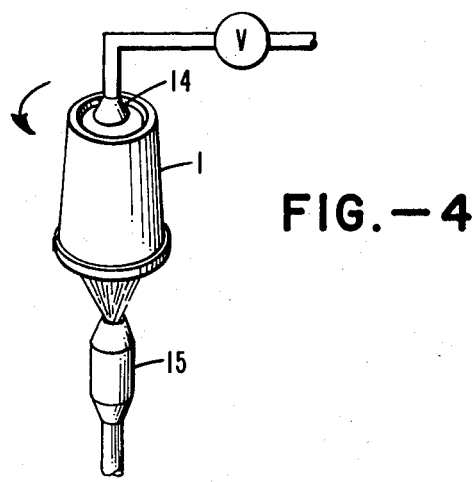
FIG.—4
INVENTORS
RICHARD WILLIAM SCHUFF
EDSON SHEPPARD HARRIS, JR
BY *Paul R. Wylie*
ATTORNEY

COATED CUP AND METHOD OF MANUFACTURE

This invention relates generally to packages for foodstuffs or the like. More specifically, it relates to packages wherein an expanded plastic bead container preferably of styrene is utilized.

Expanded plastic bead containers of styrene and other materials are well known in the art with particularly prevalent uses being in the field of hot drink cups. Heretofore, expanded plastic bead (e.g., styrene bead) containers have not been utilized in packaging dairy products such as yogurt, cottage cheese, sour cream and other products such as margerine, potato salad and sauerkraut. One of the reasons is that the liquid components of these materials will bleed through the container. Moreover, these containers commonly used are pervious to oxygen which tends to promote spoilage if the package is stored for a long time. Certain commercial and economic considerations, however, dictate the desirability of utilizing expanded plastic bead containers for packaging of the foregoing products.

According to this invention there is provided an improved package utilizing an expanded bead container and a coating set in direct contact with the plastic expanded bead material. There is also provided according to the invention a method for producing such a container.

The invention will be better understood with reference to the accompanying drawings, which show a specific embodiment thereof, and wherein:

FIG. 1 is a cross-sectional elevation of a container according to this invention;

FIG. 2 is a view similar to FIG. 1 showing a container according to the invention with a lid member installed thereon;

FIG. 3 is a cross-sectional view showing two of the container members according to the invention in nested relationship; and FIG. 4 is a schematic perspective view showing the application of a coating material to a container according to the invention.

Referring to the drawings, and particularly FIG. 1, the improved package of the invention comprises an expanded plastic bead container 1 and a coating 2 on said expanded plastic material comprising a saran latex material set in direct contact with the material of the expanded plastic bead container. It is preferred that the expanded plastic bead material be of polystyrene of the type well known in the art, commercially available and commonly used for the production of meat trays, hot drink cups, etc.

The saran latex material preferably used for the coating comprises a high vinylidene chloride content saran. It is further preferred that the saran latex material include a surfactant which has been found in accordance with the invention to provide for easy application and complete coverage of the coating; and, an anti-blocking material which has been found to facilitate the stacking and unstacking of containers produced according to the invention. The preferred surfactant material is a member selected from the group of nonyl phenoxypoly (ethyleneoxy) ethanols, of which certain members may be preferable, but all of which are useful. The anti-blocking composition is preferably a microcrystalline wax. Extremely good results have been obtainable when the foregoing composition with a saran present in the amount of about 80 to about 95 percent by weight, a surfactant in the amount of about 5 to about 15 percent by weight and an anti-blocking material in the amount of about 1 to about 10 percent. The presently preferred coating composition consists of a high vinylidene chloride saran in the amount of about 85 to about 90 percent by weight, a member selected from the group of homologous series of nonyl phenoxypoly (ethyleneoxy) ethanols, present in the amount of about 6 percent to about 10 percent by weight and microcrystalline wax present in the amount from about 2 percent to about 5 percent. All of the foregoing are based on weight percent of liquids.

One of the advantages of the invention is that the coating does not provide blocking as is sometimes occasioned by previously tried coatings. As shown in FIG. 3, the cups can be nested together and easily unnested without undue sticking. This anti-blocking feature is considered one of the advantages of the invention and is somewhat unexpected in view of the known static friction qualities of a high vinylidene chloride content material.

An important advantage of the invention is the vapor barrier property of the coating material on an expanded plastic bead container. Not only does the coating appear to serve as a vapor barrier which retains not only vapors but liquids as well, and restricts the entrance of oxygen and other gases into a sealed container, but also it seemingly provides greater insulation capacity to the already good insulation provided by the expanded plastic beads. Thus, when a container according to the invention is formed into a complete package by applying a lid 3 as shown in FIG. 2, the package thus assembled is ideal for dairy products and the other previously mentioned products which heretofore have not been packaged in expanded plastic bead containers.

Referring once again to FIG. 2, the lid 3 is formed with a downwardly directed U-shaped groove having an inner wall 5 and an outer wall 6 which are adapted to fit on an upstanding peripheral edge portion 7 of container 1. Shoulder portion 8 of external wall portion 6 is adapted to snap-fit over external ledge 9 of container 1 to provide a relatively tight seal. Inwardly directed shoulder 10 is also adapted to be located in groove 11 and further serve to seal the container. As can best be seen in FIG. 3, a stacking feature is provided by means of stacking ledge 13.

The coated container according to the invention is relatively easy to manufacture. A container 1 can be positioned with an open end downward and held in position by a vacuum pot or chuck 14 as shown in FIG. 4. The saran latex coating material can then be sprayed into the container 1 by nozzle 15, while at the same time the container is rotated. The rotation assures complete coverage of the interior and further, if the rotation is conducted at high speed, it has been found that the coating is evened out and completely impregnated into the plastic material. At high rotation speeds it is possible to drive some of the coating material completely through the plastic material of the container. To accomplish this advantageous result it is desirable to rotate a typical container having a draft angle of between 5° to 7° at a speed in excess of 2,000 revolutions per minute and preferably in excess of 3,000 revolutions per minute.

A container thus coated is then placed on a drying oven conveyor (not shown) and preferably moved through a microwave oven which quickly dries the coating from the inside out. This form of drying energy is not harmful to the container and serves to give it a hardened film without surface bubbles. If desirable, the container can then be decorated by printing or embossing. It is an advantage of this invention that the containers can be coated before the printing or embossing operation without deleteriously affecting the barrier or insulation qualities of such.

SPECIFIC EXAMPLE

The following specific example illustrates the advantages of the invention: Yogurt was placed in a container as shown in FIG. 2 and having a coating consisting of 100 parts by weight of a high vinylidene chloride latex, sold as Dow Latex XD–7151 and available from the Dow Chemical Company, Midland, Mich.; 10 parts by weight of a surfactant solution of nonyl phenoxypoly (ethyleneoxy) ethanols, sold as IGEPAL–CO–630 and available from GAF Corporation, New York, N.Y.; and 5 parts by weight of a microcrystalline wax solution, sold as NOPCO 1055–M and available from NOPCO Chemical Division of Diamond Shamrock Chemical Company, Newark, N.J. The yogurt was found to be fresh and edible after storage under refrigeration for a period of about 85 days. Yogurt stored in conventional containers for such made of impact styrene was found to be spoiled and considered "rotten" after the same period of storage under substantially identical conditions.

The foregoing specific example illustrates the commercial potential of this invention as a superior substitute for presently available containers.

One of the advantages of the invention is that various thicknesses of the coating material 2 can be applied to the container 1. It is currently preferred to have a thickness of coating material in the range of about 0.0001 to about 0.0015 on the inside of the container.

We claim:

1. An improved package comprising (a) an expanded plastic container; and (b) a coating on said container set in direct contact with said expanded plastic material, said coating comprising a saran latex composition.

2. An improved package according to claim 1 wherein said expanded plastic container is formed of expanded polystyrene beads.

3. An improved package according to claim 1 wherein said saran latex material comprises a high vinylidene chloride content saran.

4. An improved package according to claim 3 wherein said coating comprises a surfactant material.

5. An improved package according to claim 4 wherein said surfactant is non-ionic.

6. An improved package according to claim 4 wherein said surfactant comprises member selected from the group of a homologous series of nonyl phenoxypoly (ethyleneoxy) ethanols.

7. An improved package according to claim 4 wherein said coating further comprises an anti-blocking material.

8. An improved package according to claim 5 wherein said coating further comprises a microcrystalline wax.

9. An improved package comprising (a) an expanded polystyrene bead container; and (b) a coating on said container set in direct contact with said expanded polystyrene bead material, said coating comprising a saran latex material having a high vinylidene chloride content, a surfactant comprising a member selected from the group of a material of the homologous series of nonyl phenoxypoly (ethyleneoxy) ethanols and a microcrystalline wax said latex comprising from about 80 percent to about 95 percent by weight of said coating.

10. The method of coating an expanded plastic container comprising:
   a. applying a flowable coating material to the interior of said container; and,
   b. revolving said container around a central axis thereof to evenly spread said coating.

11. The method according to claim 10 further comprising the step of drying said coating in a microwave oven following the rotation of said container.

12. The method according to claim 10 wherein the speed of rotation is in the range of 2,000 to 3,000 revolutions per minute.

* * * * *